United States Patent [19]
Byrne

[11] Patent Number: 4,961,917
[45] Date of Patent: Oct. 9, 1990

[54] METHOD FOR REDUCTION OF NITROGEN OXIDES WITH AMMONIA USING PROMOTED ZEOLITE CATALYSTS

[75] Inventor: John W. Byrne, Edison, N.J.

[73] Assignee: Engelhard Corporation, Edison, N.J.

[21] Appl. No.: 341,405

[22] Filed: Apr. 20, 1989

[51] Int. Cl.$^5$ ............................ B01J 8/00; C01B 21/00
[52] U.S. Cl. ..................................................... 423/239
[58] Field of Search ................... 423/239 A, 239, 235, 423/235 D

[56] References Cited

U.S. PATENT DOCUMENTS

| | | | |
|---|---|---|---|
| 3,895,094 | 7/1975 | Carter et al. | 423/239 |
| 4,104,361 | 8/1978 | Nishikawa et al. | 423/239 |
| 4,220,632 | 9/1980 | Pence et al. | 423/239 |
| 4,473,535 | 9/1984 | Kittrell et al. | 423/239 |
| 4,735,927 | 4/1988 | Gerdes et al. | 423/239 |

*Primary Examiner*—Gregory A. Heller

[57] ABSTRACT

A method in accordance with the invention comprises passing through a zeolite catalyst as described below, a gaseous stream containing nitrogen oxides, ammonia and oxygen to selectively catalyze the reduction of nitrogen oxides and, if excess or unreacted ammonia is present, to oxidize the excess of unreacted ammonia with oxygen to hydrogen and water. The method includes the use of a zeolite catalyst composition which comprises a metal (e.g., iron or copper) promoted zeolite, the zeolite being characterized by having a silica to alumina ratio of at least about 10 and a pore structure which is interconnected in all three crystallographic dimensions by pores having an average kinetic pore diameter of at least about 7 Angstroms. Promoted zeolites of the above type have demonstrated high tolerance for sulfur poisoning, good activity for the selective catalytic reduction of nitrogen oxides with ammonia, good activity for the oxidation of ammonia with oxygen, and the retention of such good activities even under high temperature operations, e.g., 400° C. or higher, and hydrothermal conditions.

7 Claims, 2 Drawing Sheets

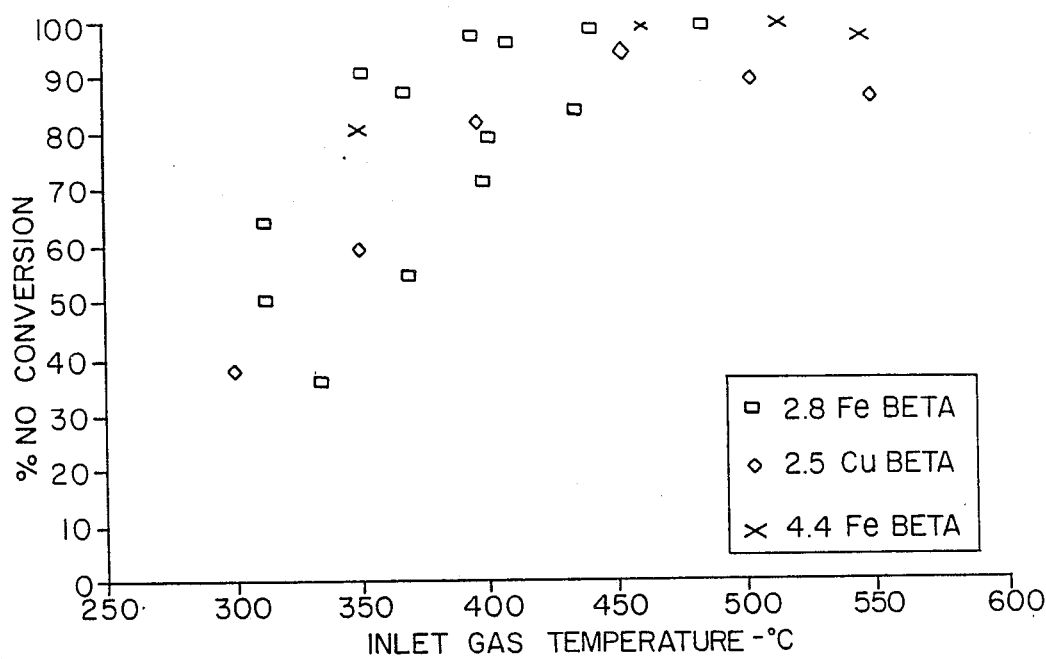
FIG. 1
FIG. 2
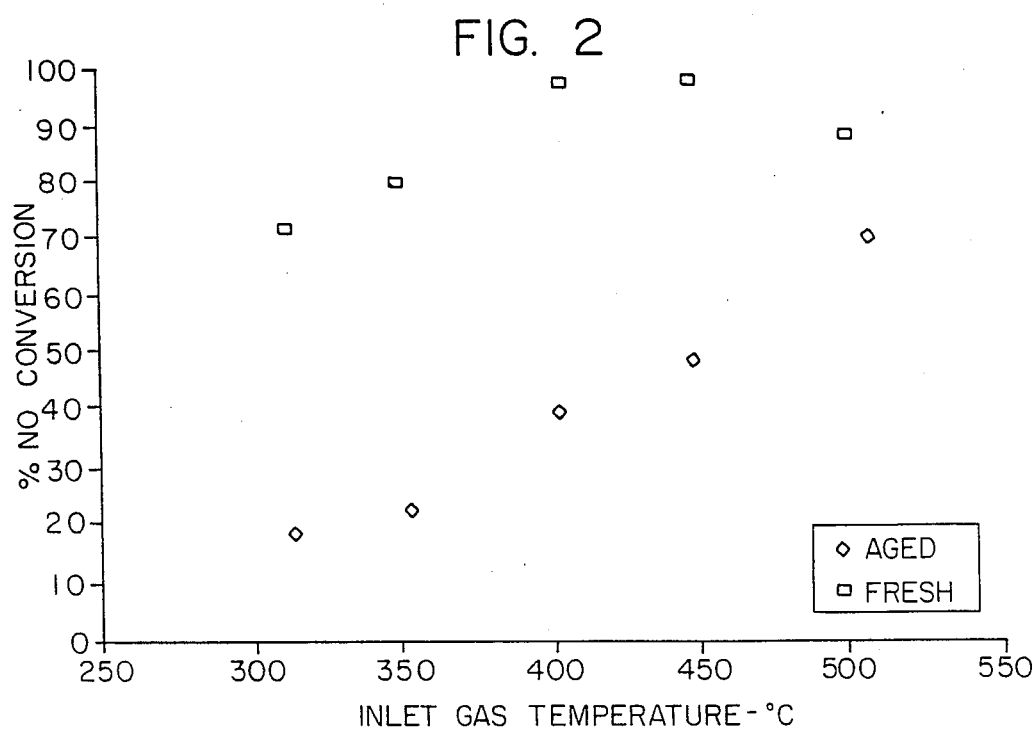

METHOD FOR REDUCTION OF NITROGEN OXIDES WITH AMMONIA USING PROMOTED ZEOLITE CATALYSTS

BACKGROUND OF THE INVENTION

1. Field of The Invention

The present invention is concerned with a method of catalyzing the reduction of nitrogen oxides with ammonia, especially the selective reduction of nitrogen oxides with ammonia in the presence of oxygen, using zeolite catalysts, especially metalpromoted zeolite catalysts.

2. The Related Art

Both synthetic and natural zeolites and their use in promoting certain reactions, including the selective reduction of nitrogen oxides with ammonia in the presence of oxygen, are well known in the art. Zeolites are aluminosilcate crystalline materials having rather uniform pore sizes which, depending upon the type of zeolite and the type and amount of cations included in the zeolite lattice, range from about 3 to 10 Angstroms in diameter.

Japanese Patent Publication (Kokai) No. 51-69476, published Jun. 16, 1976 on Application No. 49-142463, filed Dec. 13, 1974, discloses a method for reducing nitrogen oxides in waste gases by reaction with ammonia in the presence of a metal-promoted, dealuminized synthetic or natural mordenite zeolite. The resistance of the catalyst to sulfurous poisons, particularly sulfur trioxide and sulfuric acid mist, is said to be enhanced by dealuminizing the mordenite to increase the silica to alumina ratio to more than 12, preferably to more than 15. The zeolite is promoted with 0.5 to 30 weight percent of at least one of a number of promoters including copper, vanadium, chromium, iron, cobalt or nickel and used at a reaction temperature of 200° to 500° C. with from 0.5 to three times the stoichiometric amount of ammonia reductant. Example 1 of the Publication illustrates an iron-promoted mordenite ore as being effective for the reduction of nitrogen oxides. In connection with Example 2, it is stated that a slight decrease of the activity of a high silica to alumina ratio, copper-promoted mordenite catalyst is recognized when sulfur trioxide is included in the gas stream. However, an "extreme improvement" of resistance to sulfur trioxide poisoning is noted in comparison with a copper mordenite which has not been dealuminized to increase the silica to alumina ratio.

UK patent application No. 2,193,655A discloses a catalyst containing a low surface area titania and a copper-promoted zeolite for use in the reduction of nitrogen oxides with ammonia. The zeolite has an average pore diameter of 10 Angstroms or less, preferably 8 Angstroms or less, and a silica to alumina molar ratio of 10 or more, preferably 20 or more; the resultant titania/-promoted zeolite catalysts having these characteristics are stated to have good mechanical strength and to be resistant to volatile catalyst poisons such as arsenic, selenium, tellurium, etc., contained in exhaust gases. Examples of suitable zeolites are mordenite, ZSM-5, and ferrierite.

U.S. Pat. No. 4,297,328 discloses a "three-way conversion" catalytic process for the simultaneous catalytic oxidation of carbon monoxide and hydrocarbons and reduction of nitrogen oxides for purifying the exhaust gas of automobile engines operated within a prescribed range of air to fuel ratio (column 4, lines 63-68). The disclosed catalyst is a copper-promoted zeolite having a silica to alumina ratio greater than 10, preferably greater than 20 (column 6, lines 23-28). Representative high-silica zeolites are described at columns 6-8 of the patent and include (column 6, lines 29-33) silicalite (as described in U.S. Pat. No. 4,061,724), ZSM-5, ZSM-8, ZSM-11, ZSM-12, hyper Y, ultrastabilized Y, Beta, mordenite and erionite. Ultrastabilized Y is described (column 7, lines 22-25) as "a form of zeolite Y which has been treated to give it the organophilic characteristic of the adsorbents of the present invention." Example 6 of the patent is stated to show no measureable loss in combustion activity of the copper-promoted zeolite catalyst due to sulfur poisoning (exposure of the catalyst to methylmercaptan in the gaseous stream). The patent thus discloses the utility of the copper-promoted specified zeolites for three-way conversion in an exhaust gas generated by a lean air to fuel ratio combustion mixture.

The art thus shows an awareness of the utility of metal-promoted zeolite catalysts including, among others, iron-promoted and copper-promoted zeolite catalysts, for the selective catalytic reduction of nitrogen oxides with ammonia.

SUMMARY OF THE INVENTION

In accordance with the present invention, there is provided a method for the reduction of nitrogen oxides with ammonia, the method comprising the following steps. A gaseous stream containing nitrogen oxides and ammonia, and which may also contain oxygen, is contacted at a temperature of from about 250° C. to 600° C. with a sulfur-tolerant catalyst composition. The catalyst composition comprises a zeolite having a silica to alumina ratio of at least about 10, and a pore structure which is interconnected in all three crystallographic dimensions by pores having an average kinetic pore diameter of a least about 7 Angstroms, e.g., from about 7 to 8 Angstroms, and one or both of an iron and a copper promoter present in the zeolite, for example, in the amount of from about 0.1 to 30 percent by weight, preferably from about 1 to 5 percent by weight, of the total weight of promoter plus zeolite.

Another aspect of the invention provides that the promoter is an iron promoter.

Still another aspect of the present invention provides that the zeolite comprises one or more of USY, Beta and ZSM-20. A refractory binder may be admixed with the zeolites.

The gaseous stream may contain from about 0.7 to 2 moles of ammonia per mole of nitrogen oxides. Oxygen may also be present in the gaseous stream in an amount of from about 0.5 to 30 volume percent of the gaseous stream.

BRIEF DESCRIPTION OF THE DRAWINGS

FIG. 1 is a plot showing the percent conversion of NO versus inlet temperature for various metal-promoted zeolite catalysts;

FIG. 2 is a plot showing the percent conversion of NO versus the inlet temperature of a gaseous stream to be treated for aged and fresh copper-promoted zeolite catalysts;

Figure 3:
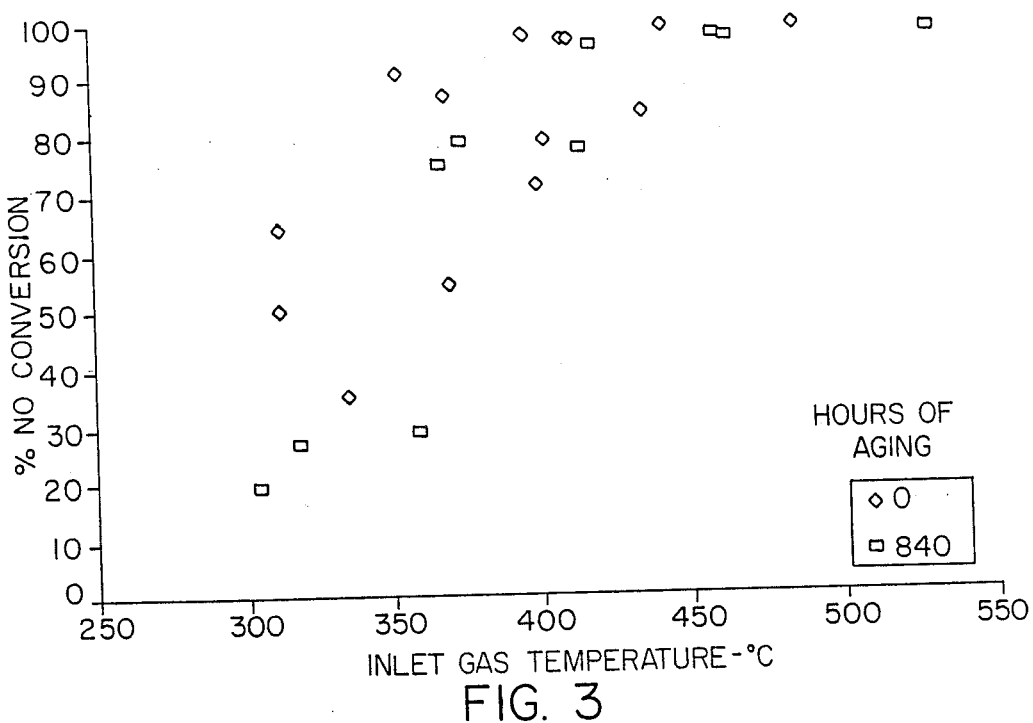
FIG. 3 is a plot showing the percent conversion of NO versus inlet temperature of a gas stream passed through aged and fresh iron promoted beta zeolite catalysts.

References herein and in the claims to a zeolite catalyst containing a percent "by weight" promoter means a percentage calculated as the weight of promoter, as the metal, divided by the combined weights of promoter (as the metal) plus the zeolite.

Reference herein and in the claims to "metal", "iron" and "copper" with respect to the promoters should not be taken to imply that the promoter is necessarily in the elemental or zero valence state; the terms enclosed in quotes should be understood to include the presence of promoters as they exist in the catalyst compositions, e.g., as exchanged ions and/or impregnated ionic or other species.

DETAILED DESCRIPTION OF THE INVENTION AND PREFERRED EMBODIMENTS THEREOF

In order to reduce the emissions of nitrogen oxides from flue and exhaust gases, such as the exhaust generated by gas turbine engines, ammonia is added to the gaseous stream containing the nitrogen oxides and the gaseous stream is then contacted with a suitable catalyst at elevated temperatures in order to catalyze the reduction of nitrogen oxides with ammonia. Such gaseous streams often inherently contain substantial amounts of oxygen. For example, a typical exhaust gas of a turbine engine contains from about 2 to 15 volume percent oxygen and from about 20 to 500 volume parts per million nitrogen oxides, the latter normally comprising a mixture of NO and $NO_2$. Usually, there is sufficient oxygen present in the gaseous stream to oxidize residual ammonia, even when an excess over the stoichiometric amount of ammonia required to reduce all the nitrogen oxides present is employed. However, in cases where a very large excess over the stoichiometric amount of ammonia is utilized, or wherein the gaseous stream to be treated is lacking or low in oxygen content, an oxygen-containing gas, usually air, may be introduced between the first catalyst zone and the second catalyst zone, in order to insure that adequate oxygen is present in the second catalyst zone for the oxidation of residual or excess ammonia. The reduction of ammonia with nitrogen oxides to form nitrogen and $H_2O$ can be catalyzed by metal-promoted zeolites to take place preferentially to the oxidation of ammonia by the oxygen, hence the process is often referred to as the "selective" catalytic reduction ("SCR") of nitrogen oxides, and is sometimes referred to herein simply as the "SCR" process.

The catalysts employed in the SCR process ideally should be able to retain good catalytic activity under high temperature conditions of use, for example, 400° C. or higher, under hydrothermal conditions and in the presence of sulfur compounds. High temperature and hydrothermal conditions are often encountered in practice, such as in the treatment of gas turbine engine exhausts. The presence of sulfur or sulfur compounds is often encountered in treating the exhaust gases of coal-fired power plants and of turbines or other engines fueled with sulfurcontaining fuels such as fuel oils and the like.

Theoretically, it would be desirable in the SCR process to provide ammonia in excess of the stoichiometric amount required to react completely with the nitrogen oxides present, both to favor driving the reaction to completion and to help overcome inadequate mixing of the ammonia in the gaseous stream. However, in practice, significant excess ammonia over the stoichiometric amount is normally not provided because the discharge of unreacted ammonia from the catalyst would itself engender an air pollution problem. Such discharge of unreacted ammonia can occur even in cases where ammonia is present only in a stoichiometric or sub-stoichiometric amount, as a result of incomplete reaction and/or poor mixing of the ammonia in the gaseous stream. Channels of high ammonia concentration are formed in the gaseous stream by poor mixing and are of particular concern when utilizing catalysts comprising monolithic honeycomb-type carriers comprising refractory bodies having a plurality of fine, parallel gas flow paths extending therethrough because, unlike the case with beds of particulate catalysts, there is no opportunity for gas mixing between channels. It is therefore also desirable that the catalyst employed to catalyze the selective catalytic reduction of nitrogen oxides, be effective to catalyze the reaction of oxygen and ammonia, in order to oxidize excess or unreacted ammonia to $N_2$ and $H_2O$.

The present invention is predicated on the discovery that a certain class of zeolites, especially when promoted with a promoter such as iron or copper, especially iron, exhibits desired characteristics as described above by providing a sulfur tolerant catalyst which shows good activity for both (1) the selective catalytic reduction of nitrogen oxides by reaction with ammonia, even in the presence of oxygen, and (2) the oxidation of ammonia with oxygen when nitrogen oxides are at very low concentrations. The catalysts of the present invention retain such activity even after prolonged exposure to high temperatures, hydrothermal conditions, and sulfate contamination of the type often encountered in use, e.g., in the treatment of coal-fired power plants or turbine engine exhaust gases.

Generally, in accordance with the practices of the present invention, a catalyst is provided which comprises a zeolite having specific properties as described below, and which is promoted by a metal, preferably iron, in order to enhance its catalytic activity. The zeolite may be provided in the form of a fine powder which is admixed with or coated by a suitable refractory binder, such as bentonite or silica, and formed into a slurry which is deposited upon a suitable refractory carrier. Typically, the carrier comprises a member, often referred to as a "honeycomb" carrier, comprising one or more refractory bodies having a plurality of fine, parallel gas flow passages extending therethrough. Such carriers are, of course, well known in the art and may be made of any suitable material such as cordierite or the like. The catalysts of the present invention may also be provided in the form of extrudates, pellets, tablets or particles of any other suitable shape, for use as a packed bed of particulate catalyst, or as shaped pieces such as plates, saddles, tubes or the like.

The catalysts of the present invention show a marked resistance to poisoning by sulfates (or other sulfur compounds) which are often contained in the gas streams which are treatable by the catalysts of the present invention. Without wishing to be bound by any particular theory, it appears that $SO_2$ poisoning has both short term and long term effects. For example, flowing a gas stream containing 2,000 parts per million by volume ("Vppm") $SO_2$ through catalysts comprising copper-promoted small to medium pore zeolites such as ZSM-5, naturally occurring chabazite and clinoptilolite, resulted in 10 to 40 percent reduction in SCR process activity. Even at $SO_2$ levels as low as 130 Vppm $SO_2$, significant activity reduction for the SCR process was noted for such catalysts. On the other hand, larger pore zeolites such as Y, L and USY exhibited no short-term $SO_2$ susceptibility. With operating temperatures at about 350° C., the short-term $SO_2$ poisoning effect on a copper-promoted mordenite was shown to be reversible. Thus, when the supply of $SO_2$ to the test gas stream passing through the copper-promoted mordenite catalyst was turned off, the activity for catalytic reduction of NO immediately returned to the same level attained by the catalyst prior to introducing the $SO_2$. Apparently, $SO_2$ is absorbed, but not tightly bound in the zeolite pores. In the case of the small to medium pore zeolites, this competition absorption with $NH_3$ and NO probably results in a physical blockage and/or diffusional restriction.

On the other hand, when zeolite catalysts are subjected to higher $SO_2$ concentrations for longer periods of time, such as 5,000 Vppm $SO_2$ for protracted periods, such as overnight, a 15 to 25 percent activity reduction for the SCR process was noted for copper promoted, synthetic iron-free zeolites. A 60 percent reduction in SCR process activity is typical for $Fe_2O_3$ containing natural chabazite. Similar results were sustained with iron promoted mordenite catalysts.

Even at lower levels of $SO_2$ concentration, similar to those likely to be encountered in commercial operations, a permanent activity loss for the SCR process is shown by many zeolite catalysts. For example, a copper-promoted mordenite catalyst was subjected overnight to passage through it of a gaseous stream containing 540 Vppm $SO_2$, and showed a permanent activity loss comparable to that described above for the catalysts subjected to the 5000 Vppm $SO_2$-containing gas.

For zeolites with silica-to-alumina ratios of less than 10, the activity loss appears to be associated with insufficient stability under the simulated acidic aging conditions. As indicated by the prior art noted above, the utilization of high ratios of silica to alumina is known to enhance acid resistance of the zeolite and to provide enhanced resistance of the zeolite to acid sulfur poisoning. Generally, silica to alumina ratios well in excess of the minimum of 10 may be employed. Conversion efficiencies of 90 to 93% for $NO_x$ reduction with ammonia have been attained with fresh copper promoted Beta zeolites having silica to alumina ratios of 20, 26, 28, 37 and 62. A conversion efficiency of 77% was attained by a fresh copper promoted ZSM-5 zeolite having a silica to alumina ratio of 46. However, fresh copper promoted USY zeolites with silica to alumina ratios of, respectively, 8 and 30 provided 85% and 39% conversions of $NO_x$, suggesting that at least for USY, silica to alumina ratios should be significantly less than 30.

However, resistance to short term sulfur poisoning and the ability to sustain a high level of activity for both the SCR process and the oxidation of ammonia by oxygen has been found to be provided by zeolites which also exhibit pore size large enough to permit adequate movement of the reactant molecules NO and $NH_3$ in to, and the product molecules $N_2$ and $H_2O$ out of, the pore system in the presence of sulfur oxide molecules resulting from short term sulfur poisoning, and/or sulfate deposits resulting from long term sulfur poisoning. The pore system of suitable size is interconnected in all three crystallographic dimensions. As is well known to the those skilled in the zeolite art, the crystalline structure of zeolites exhibits a complex pore structure having more or less regularly recurring connections, intersections and the like. Pores having a particular characteristic, such as a given dimension diameter or cross-sectional configuration, are said to be one dimensional if those pores do not intersect with other like pores. If the pores intersect only within a given plane with other like pores, the pores of that characteristic are said to be interconnected in two (crystallographic) dimensions. If the pores intersect with other like pores lying both in the same plane and in other planes, such like pores are said to be interconnected in three dimensions, i.e., to be "three dimensional". It has been found that zeolites which are highly resistant to sulfate poisoning and provide good activity for both the SCR process and the oxidation of ammonia with oxygen, and which retain good activity even when subject to high temperatures, hydrothermal conditions and sulfate poisons, are zeolites which have pores which exhibit a pore diameter of at least about 7 Angstroms and are interconnected in three dimensions. Without wishing to be bound by any specific theory, it is believed that the interconnection of pores of at least 7 Angstroms diameter in three dimensions provides for good mobility of sulfate molecules throughout the zeolite structure, thereby permitting the sulfate molecules to be released from the catalyst to free a large number of the available adsorbent sites for reactant $NO_x$ and $NH_3$ molecules and reactant $NH_3$ and $O_2$ molecules. Any zeolites meeting the foregoing criteria are suitable for use in the practices of the present invention; specific zeolites which meet these criteria are USY, Beta and ZSM-20. Other zeolites may also satisfy the aforementioned criteria.

A number of tests were conducted in order to evaluate the catalytic activity and selectivity for the SCR process and ammonia oxidation, of both fresh and aged catalysts comprising iron promoted zeolites and copper promoted zeolites. All the catalysts employed in these tests were prepared from the same $NH_4+$ form of Beta zeolite powder, which was synthesized as described in the following Example 1.

Reference is made below to the weights of solids being on a "vf basis". The term in quotes means a volatiles-free basis, and is used to indicate the weight that the solid in question would have if it were calcined at 1000° C. to drive off volatiles. Thus, if 10.1 grams of a substance contains 0.1 gram of such volatiles, the 10.1 grams is reported as "10 grams (vf basis)". Unless specifically otherwise stated, all percentages by weight herein and in the claims are on a vf basis.

EXAMPLE 1

I. Synthesis of Batch 1:
   A. The following materials were combined in a 100 gallon, titanium lined, autoclave reactor and stirred sufficiently to maintain the solids in suspension:
      1. 18.28 Kg of Hi-sil ® #233 silica powder
      2. Sufficient amounts of each of the following to result in molar ratios of $SiO_2$, $Na_2O$, $H_2O$, and (Tetraethylammonium)$_2$O to $Al_2O_3$ of 23.1, 1.94, 767, and 1.62, respectively:
         a. Nalco sodium aluminate solution (20.9% $Al_2O_3$, 24.7% $Na_2O$, 54.0% $H_2O$)
         b. 40% solution of Tetraethylammonium hydroxide (TEAOH)
         c. Deionized water
   B. To the mixture obtained in step A was added 1.38 Kg (vf basis) of zeolite Beta powder.

C. The reactor was sealed and heated to 150° C. with continued stirring.

D. After 6 days at 150° C. the reactor was cooled to room temperature and three separate batches as the slurry contained in the reactor were filtered in a twelve inch square filter press to separate the solids from the reaction liquor. The solids from the first two filter batches were not washed, while the solids from the third batch was washed with several gallons of deionized water.

E. The resultant filter cakes were combined and dried at 100° C. Next, a 13.0 Kg batch of the dried solids was calcined for 1 hour at 316° C. followed by 1 hour at 593° C. The resultant calcined powder, which was designated Batch 1, had a molar $SiO_2/Al_2O_3$ ratio of 17/1 (by chemical analysis) and a BET surface area of 562 $m^2/g$. Analysis by x-ray diffraction showed the characteristic peaks associated with Beta zeolite.

II. Synthesis of Batch 2:

A. Step A of the procedure used to prepare Batch 1 was repeated, except that 36.56 Kg of Hi-sil ® #233 silica powder and sufficient amounts of the same materials as used in Step A of the preparation of Batch 1 were used to result in molar ratios of $SiO_2$, $Na_2O$, $H_2O$, and $(Tetraethylammonium)_2O$ to $Al_2O_3$ of 23.1, 1.94, 383, and 1.62 respectively.

B. To the mixture obtained in Step A was added 2.76 Kg (vf basis) of zeolite Beta powder of Batch 1.

C. The reactor was sealed and heated to 150° with continued stirring.

D. After 6 days at 150° C. the reactor was cooled to room temperature and batches of the slurry contained therein were filtered in a twelve square inch filter press to separate the solids from the reaction liquor. All the solids obtained were washed by passing deionized water through the filter cake.

E. The resultant filter cake solids were combined and dried at 100° C. A 26.4 Kg (vf basis) batch of the dried solids was calcined for 1 hour at 316° C., followed by 1 hour at 593° C. The resultant calcined powder, which was designated Batch 2, had a molar $SiO_2/Al_2O_3$ ratio of 18/1 (by chemical analysis) and a BET surface area of 577 $m^2/g$. Analysis by x-ray diffraction showed the characteristic peaks associated with Beta zeolite.

III. A master lot of zeolite Beta was made by combining 7.7 Kg of the Batch 1 powder and 26.4 Kg of the Batch 2 powder. The resultant 34.1 Kg master lot of zeolite Beta was $NH_4+$ ion exchanged, as follows.

A. A solution was prepared by mixing 51.1 Kg of 54% $NH_4NO_3$ solution with 68.1 Kg of deionized water.

B. To the solution of Step A was added the master lot of Beta powder, with stirring sufficient to suspend the solids.

C. The pH of the suspension of Step B was adjusted from 3.9 to 3.15 using 484 g of concentrated $HNO_3$, and the slurry was heated to 82° C.

D. After 30 minutes at 82° C., the slurry was cooled, and then filtered on a vacuum filter to separate the solids from the spent exchange solution and provide an $NH_4+$ Beta powder, designated $NH_4+$ Beta. $Na_2O$ analysis was 0.47% by weight, vf basis.

The resultant $NH_4+$ Beta was used to prepare iron promoted zeolite catalysts, as shown in the following Example 2.

EXAMPLE 2

I. A portion of the $NH_4+$ Beta powder of Example 1 was promoted with iron as follows.

A. 8.35 Kg (vf) of the $NH_4+$ Beta exchanged powder was combined (with stirring) with an aqueous solution of $Fe_2(SO_4)_3$ that contained 3% by weight Fe. A ratio of 2.5 parts by weight of solution per part by weight of $NH_4+$ Beta powder (on a vf basis) was used.

B. With continued stirring, the slurry of Step A was heated to 82° C. for one hour, and then cooled.

C. The cooled slurry of Step B was then vacuum filtered and washed with a equal volume of deionized water.

D. The filter cake of Step C was dried at 100° C. to provide an iron-promoted Beta powder, designated Fe Beta 1.

E. Chemical analysis of Fe Beta 1 showed that it contained 2.78% iron (expressed as the metal on a vf basis).

F. One half of the Fe Beta 1 had additional Fe added to it, using the same procedure described in steps A–D above, except that the iron sulfate solution contained only 1.5% by weight Fe. After drying, this material was calcined for 2 hours at 538° C. to provide an iron promoted Beta powder designated Fe Beta 2.

G. Chemical analysis of Fe Beta 2 showed that it contained 4.42% iron (expressed as the metal on a vf basis).

The $NH_4+$ Beta of Example 4 was used to prepare copper promoted zeolite catalysts, as shown in the following Example 3.

EXAMPLE 3

A portion of the $NH_4+$ Beta powder of Example 1 was promoted with copper as follows:

A. 25.0 Kg (vf) of the $NH_4+$ Beta powder was added to 56.25 Kg of $Cu(SO_4)$ solution containing 5% by weight Cu, with stirring to suspend the solids and disperse the lumps.

B. With continued stirring, the slurry of Step A was heated to 82° C. for one hour, and then cooled.

C. The cooled slurry of Step B was vacuum filtered to separate the solids from the liquid, and the solids were washed with a volume of deionized water equal to the volume of the separated liquid.

D. The powder of Step C was dried at 100° C. to provide a copper promoted Beta powder, designated Cu Beta 1. Chemical analysis showed that the Cu Beta 1 powder contained 3.42% by weight Cu (expressed as the metal on a vf basis).

E. Two-thirds by weight of the Cu Beta 1 dried powder was reslurried (with continuous stirring) in deionized water in a ratio of 3 parts by weight of water to one part by weight (vf basis) of the Cu Beta 1 powder.

F. After one hour at room temperature, the slurry of Step E was vacuum filtered to remove the water and allowed to air dry overnight.

G. The powder obtained from Step E was again subjected to the re-slurrying filtering and drying of Steps E and F, but with a weight ratio of water/powder of 2.5/1 instead of 3/1.

H. The air dried filter cake obtained from Step G was oven dried at 100° C., and then calcined for 2 hours at 538° C. to provide a copper promoted Beta designated Cu Beta 2.

I. Chemical analysis of Cu Beta 2 showed that this powder contained 2.56% Cu (expressed as the metal on a vf basis).

The $NH_4^+$ Beta obtained in Example 1 and the iron (Fe Beta 1 and Fe Beta 2) and copper (Cu Beta 1 and Cu Beta 2) promoted catalysts obtained in Examples 2 and 3 were prepared for testing as described in the following Example 4.

EXAMPLE 4

I. Small portions of each powder (Fe Beta 1, Fe Beta 2, Cu Beta 1 and Cu Beta 2) were separately granulated into a $-40+80$ mesh screen fraction for testing. This was done as follows:
   A. Several disks were made at nominally 10,000–15,000 lb/in² pressure from each powder, using a tool steel die in a hydraulic press.
   B. Each disk was gently ground with a porcelain mortar and pestle, and the resultant granules screened through 40 and 80 mesh screens.
   C. The size fraction that passed through 40 mesh and was retained upon the 80 mesh screen was used for testing.

II. Samples of $NH_4^+$ Beta powder, Fe Beta 1, Fe Beta 2, Cu Beta 1 and Cu Beta 2 powders were aged for 840 hours at 520° C. using the following procedure.
   A. Several grams of each $-40+80$ mesh powder were placed in separate compartments of glazed porcelain refractory boats (nominally 1.5 cm wide × 1.5 cm deep × 10 cm long, with each compartment being 2 cm long).
   B. The boats were placed in the hot zone of a 5 cm diameter horizontal tube furnace, and the furnace was sealed.
   C. A gas containing 10% $O_2$, 20% $H_2O$, and the balance $N_2$, was passed through the furnace tube at a rate of 22 liters per minute ("l/min") and the furnace was heated to a hot zone temperature of 520° C. As used herein "l/min" means liters per minute based on standard conditions of temperature and pressure, i.e., 20° C. and 1.0 atmospheres.
   D. After the furnace had reached temperature, sufficient water was injected into the entrance of the hot zone to provide a 10% steam environment.
   E. After 840 hours the furnace was cooled and the samples removed. The refractory boat containing the $NH_4^+$ Beta sample and the Fe Beta 2 sample (4.42% Fe) failed during aging, and those samples were lost.

The prepared samples were tested for catalytic activity, as described in the following Example 5.

EXAMPLE 5

I. The aged samples obtained from Example 4 were tested as catalysts for selective catalytic reduction of $NO_x$ activity ("SCR Testing") and for $NH_3$ oxidation activity, using nominally 3 millimeter inside diameter, "U" shaped Vycor reactors having two vertical legs nominally 20 cm long, and a semicircular bottom section nominally 5 cm in diameter. The procedure used was as follows:
   A. A plug of fused silica wool was placed at the base of the vertical section of the inlet leg of one of the reactors.
   B. One tenth of a gram (0.1 g) of the $-40+80$ mesh Beta powder to be tested was placed on the silica wool to serve as the catalyst bed, and a Vycor thermocouple well was positioned just above the catalyst bed.
   C. Between 1 and 3 reactors were placed in a reactor furnace and connected to the gas supply system.
   D. $N_2$ and air were mixed into a gas containing 10% $O_2$ and the balance $N_2$, and this was passed through a furnace where it was preheated to 350° C.
   E. The heated gas stream of Step D was then divided among the reactors such that each reactor received a flow rate of 2 l/min. (for a space velocity of $1.2 \times 10^6$ ccg$^{-1}$hr$^{-1}$).
   F. The reactor furnace was then heated to a temperature nominally 50° C. above the test temperature, such that the reactor thermocouples read the nominal test temperature.
   G. The reaction gases were than added to the inlet gas stream in the following amounts:
      1. For SCR testing, 200 parts per million parts by volume "Vppm" each of NO and $NH_3$ were added to the gas.
      2. For $NH_3$ oxidation activity testing, 200 Vppm of $NH_3$ was added to the gas.
   H. After all the flows and temperatures had stabilized, the inlet and outlet concentrations of $NO_x$ and $NH_3$ were measured using a Thermoelectron Model 10 $NO_x$ analyzer for both $NO_x$ and $NH_3$ analysis. Periodic $NH_3$ measurements were verified using the Draeger tube method.
   I. The gas temperature was then changed, and the measurements repeated as in Step H above.

The results obtained by the tests of Example 5 are plotted in FIGS. 1–4.

In each of FIGS. 1, 2 and 3 the percentage conversion of nitric oxide (NO) in the test gas is plotted on the vertical axis, and the test gas inlet temperature (to the catalyst bed) is plotted on the horizontal axis. The nitric oxide (NO) content of the test gas is representative of nitrogen oxides ($NO_x$) generally, and so reference below is made to $NO_x$ conversion.

FIG. 1 compares the $NO_x$ SCR process conversion in the test gas flowed through beds comprised of fresh samples of Cu Beta$^{-2}$, Fe Beta$^{-1}$ and Fe Beta 2. In FIG. 1, data points for Cu Beta 2 are shown by diamonds, for Fe Beta 1 by rectangles and for Fe Beta 2 by Xs. The data of FIG. show that the copper and iron promoted Beta powders have similar SCR activities and selectivities although, as evidenced by the slight conversion decrease with Cu Beta 2 above about 450° C., the iron promoted catalysts, Fe Beta 1 and Fe Beta 2, may have less of a tendency than copper promoted Beta to oxidize $NH_3$ in the presence of $NO_x$.

FIG. 2 compares the $NO_x$ SCR process conversion in the test gas flowed through beds comprised of fresh and aged samples of Cu Beta$^{-1}$. In FIG. 2, data points for aged Cu Beta 1 are shown by diamonds and for fresh Cu Beta 1 by reactangles. The data of FIG. 1 show that Cu Beta$^{-1}$ experienced substantial deactivation during aging.

FIG. 3 compares the $NO_x$ SCR process conversion in the test gas flowed through beds comprised of fresh and aged samples of Fe Beta$^{-1}$. In FIG. 3, data points for fresh Fe Beta 1 are shown by diamonds, and data points for aged (840 hours) Fe Beta 1 are shown by reactangles. The data of FIG. 3 show that Fe Beta$^{-1}$ did not deactivate after 840 hours of aging.

Figure 4:
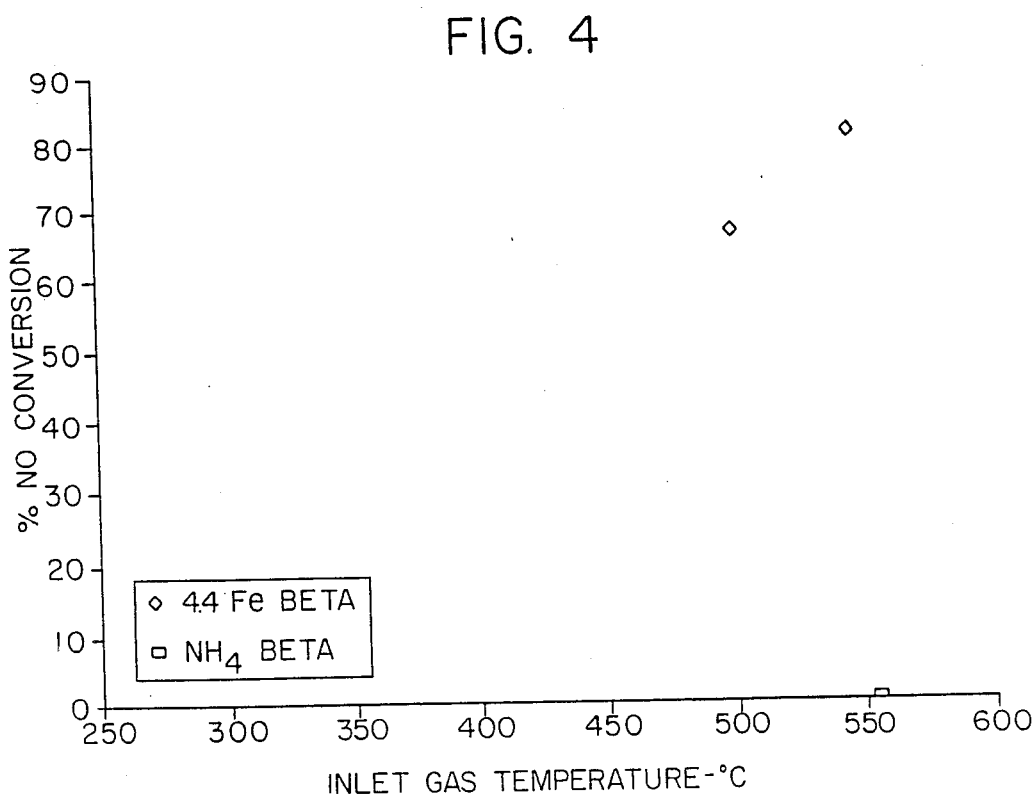
FIG. 4 is a plot showing the percent conversion of ammonia versus inlet temperature of a gas stream fed to different beta zeolite catalysts.

In FIG. 4, the percentage conversion on $NH_3$ in the test gas is plotted on the vertical axis, and the test gas inlet temperature (to the catalyst bed) is plotted on the horizontal axis. FIG. 4 compares the NH$_3$ conversion in the test gas flowed through beds comprised of fresh samples of Fe Beta$^{-2}$ and NH$_4$$^+$ Beta. In FIG. 4, data points for Fe Beta 2 are shown by diamonds and data points for NH$_4$+ Beta are shown by rectangles. The data of FIG. 4 show excellent conversion of NH$_3$ by Fe Beta 2 and no conversion by NH$_4$$^+$ Beta. Analysis showed that the NH$_3$ oxidation was selective to N$_2$ and H$_2$O, and there was no evidence of NO$_x$ formation with either tested catalyst. The Fe Beta$^{-2}$ showed substantial NH$_3$ oxidation activity in the absence of NO$_x$, producing about 80+% conversion even at the exceptionally high space velocity of $1.2 \times 10^6$ ccg$^{-1}$hr$^{-1}$. NH$_4$$^+$ Beta produced no detectable NH$_3$ conversion under these conditions.

The results above show that iron promoted Beta is a highly active and selective bifunctional catalyst that is particularly well suited for the SCR process and excess or residual ammonia oxidation at temperature above about 400° C. It is extremely active and selective for the SCR process reaction when NH$_3$ and NO$_x$ are both present. However, under conditions where there is excess NH$_3$ present, the iron promoted catalyst is extremely active for the selective oxidation of NH$_3$ by oxygen to N$_2$ and water. In addition, iron promoted Beta does not deactivate during exposure to hydrothermal conditions similar to those expected in a high temperature SCR process environment, such as the exhaust of a gas turbine. Copper promoted Beta, while exhibiting catalytic performance similar to that of iron promoted Beta in the fresh state, deactivated noticeably during aging.

In order to demonstrate the enhanced sulfur resistance provided by zeolite catalysts made in accordance with the present invention, a series of metal-promoted zeolite catalysts were prepared by techniques similar to those described above and subjected to aging in both SO$_2$ containing and SO$_2$ free gaseous streams, as described in the following Example 6.

EXAMPLE 6

Three catalyst samples in accordance with the present invention were prepared as clay bound extrudates by the following general procedure: −100 mesh dried zeolite powder was combined with Georgia Kaolin GK 129 bentonite clay and FMC Avicel ® microcrystalline cellulose in a ratio of 4 parts by weight zeolite powder (vf basis) to 1 part by weight clay (vf basis) plus 3% by weight cellulose (based on the total vf weight of zeolite and clay). To this dried mixture was added a minimum amount of deionized water to produce a paste having a consistency of putty. This paste was then extruded through a 60 cc plastic syringe having an aperture of about 0.063 inches in diameter. The resultant extrudates were dried at 100° C. then calcined for 2 hours at 538° C. The three catalyst samples so made were designated as: Catalyst 1, comprising a ZSM-20 zeolite promoted with 3.76 weight percent copper; Catalyst 2, a Beta zeolite catalyst promoted with 4.11 percent iron; and Catalyst 3, a Beta zeolite catalyst promoted with 3.23 percent copper. The ZSM-20 zeolite powder (SiO$_2$/Al$_2$O$_3$ molar ratio of 14/1 by chemical analysis) and Beta zeolite powder (SiO$_2$/Al$_2$O$_3$ molar ratio of about 20/1 by chemical analysis) were synthesized in the laboratory and were identified as such by x-ray diffraction and surface area analysis. The as-synthesized zeolites were then ammonium exchanged to less than 0.75% by weight Na$_2$O (vf basis) in a manner similar to that described in Example 1.

A comparative extrudate catalyst, designated Catalyst C, comprised a hydrogen mordenite catalyst promoted with 2.86 percent copper. The mordenite zeolite powder used was Linde LZM-8 (SiO$_2$/$_1$ /Al$_2$O$_3$ molar ratio of 18/1 by chemical analysis). The addition of Cu and Fe was accomplished via standard impregnation techniques or by exchange procedures similar to those described in Examples 2 and 3. Mordenite does not possess the pore structure (about 7 Angstroms diameter pores interconnected in all three crystallographic dimensions) which characterizes the zeolites of the present invention.

All the promoting metal loadings given above are calculated on the basis of the copper or iron being taken as the metal, and are based on the weight of the promoter, as metal, plus zeolite. Two samples of each catalyst were prepared and one sample was aged in a 0.625 inch (1.59 cm) diameter stainless steel reactor in an SO$_2$ environment by having flowed therethrough a gas containing 5,000 Vppm SO$_2$, 1,000 Vppm NO, 10 volume percent H$_2$O, and 10 volume percent oxygen, balance N$_2$. This aging gas was passed through a 4.5 inch (11.4 cm) deep bed of the catalyst samples at a temperature of 350° C. and a volumetric velocity of 12,500 volumes of gas, measured at standard conditions of temperature and pressure, per volume of catalyst per hour. The aged samples plus a second sample of each of the four unaged catalysts were placed into a 0.625 inch (1.59 cm) diameter stainless steel reactor in beds about 3 inches (7.6 cm) deep. A gas containing 400 Vppm NO plus 400 Vppm NH$_3$, 10 percent H$_2$O and 10 percent O$_2$, balance N$_2$ was passed through the beds of catalyst samples at a temperature of 350° C. and a volumetric flow rate of 150,000 volumes of gas, measured at standard temperature and pressure, per volume of catalyst per hour. The following Table I shows the activity of the catalysts in terms of the percent of NO$_x$, i.e., NO, converted by the respective unaged samples and the samples aged for the indicated aging periods. The "SO$_2$ added" column shows the conversion efficiencies attained with the same test gas to which 2,000 Vppm SO$_2$ have been added.

TABLE I

| Catalyst | Aging Time (hrs) | % NO$_x$ Conversion | |
|---|---|---|---|
| | | NO SO$_2$ | SO$_2$ Added |
| Catalyst 1 | 0 | 87 | 86 |
| | 64 | 75 | 75 |
| | 192 | 66 | 66 |
| Catalyst 2 | 0 | 88 | 90 |
| | 162 | 70 | |
| Catalyst 3 | 0 | 88 | 85 |
| | 64 | 70 | |
| | 129 | 64 | |
| Catalyst C | 0 | 90 | 80 |
| | 64 | 57 | |
| | 129 | 37 | |

The results of Table I show that the activity of fresh Catalyst 1, Catalyst 2 and Catalyst 3, each being a catalyst in accordance with the teachings of the present invention, was practically the same whether or not SO$_2$ was present in the gas being treated. On the other hand, fresh Catalyst C, a copper promoted mordenite catalyst which lies outside the scope of the present invention, showed a significant reduction in conversion efficiency, from 90% to 80%, immediately upon the introduction of SO$_2$ to the gas stream being treated.

The data of Table I also shows that Catalysts 1, 2 and generally retained higher activities, i.e., higher percent conversion of NO$_x$, in the SCR process upon aging than did comparative Catalyst C. Thus, Catalyst 1 showed an activity decline from 87% to 66% after 192 hours, Catalyst 2 showed an activity decline from 88% to 70% after 162 hours, and Catalyst 3 showed an activity decline from 88% to 64% after 129 hours. These declines are much smaller than that of comparative Catalyst C, which showed an activity decline from 90% to 37% after 129 hours.

The data of Table I clearly show that catalysts made in accordance with the teaching of the present invention are substantially more resistant to sulfate poisoning than the comparative sample.

As described above, the zeolites useful in the present invention have a silica to alumina ratio in excess of 10 in order to enhance their resistance to acidic conditions and therefore their resistance to acidic sulfur poisoning. A number of catalysts in accordance with the present invention were prepared with different silica to alumina ratios and tested for their conversion activity in the SCR process, in an attempt to determine if changes in the silica to alumina ratio affected activity. The catalysts were prepared and tested as described in the following Example 7.

EXAMPLE 7

The catalyst samples were prepared as clay bound extrudates according to the procedure described in Example 6. The Beta zeolites were synthesized in the laboratory and were identified as such by x-ray diffraction and surface area analysis. Beta zeolites with increased SiO$_2$/Al$_2$O$_3$ molar ratios (as determined by chemical analysis) were prepared by corresponding increases in the reagent SiO$_2$/Al$_2$O$_3$ molar ratios used. As-synthesized Beta zeolites were then ammonium exchanged to less than 0.50%5 by weight Na$_2$O (vf basis) in a manner similar to that described in Example 1. The USY zeolite with a SiO$_2$/Al$_2$O$_3$ molar ratio of 8/1 (by x-ray unit cell size determination) was prepared by a standard steam ultrastabilization/ammonium exchange of Linde LZY062 (NH$_4$$^+$/Na$^+$-Y zeolite). The USY zeolite used with a SiO$_2$/Al$_2$O$_3$ molar ratio of 30/1 (by x-ray unit cell size determination) was Toyo Soda #TSZ-360 HUA. The addition of Cu and Fe was accomplished via standard impregnation techniques or by exchange procedures similar to those described in Examples 2 and 3.

The extrudate catalysts were tested in a 0.625 inch (1.59 cm) diameter stainless steel reactor by flowing through a 3 inch (7.6 cm) deep bed of the fresh catalyst a test gas having an inlet temperature of 350° C. and containing 400 Vppm NO, 400 Vppm NH$_3$, 10 percent by volume O$_2$ and 10 percent by volume H$_2$O, balance nitrogen. The test gas was flowed through the fresh catalyst bed at a volumetric velocity of 150,000 volumes of gas, measured at standard temperature and pressure, per volume of catalyst per hour and the percentage of NO originally in the gas which was converted to N$_2$ and H$_2$O was measured. The results set forth in the following table were attained.

TABLE II

| Catalyst | SiO$_2$/Al$_2$O$_3$ | % NO$_x$ Conversion |
| --- | --- | --- |
| 1.73% Cu/Beta | (20) | 90 |
| 1.63% Cu/Beta | (26) | 93 |
| 1.17% Cu/Beta | (28) | 93 |
| 1.80% Cu/Beta | (37) | 90 |
| 1.66% Cu/Beta[3] | (62) | 93 |
| 1.97% Cu/USY | (8) | 85 |
| 2.20% Cu/USY | (30) | 39 |

The data of Table II show that increasing the silica to alumina ratio of Beta zeolite had no effect on the conversion efficiency provided by the catalyst, whereas an increase of the silica to alumina ratio of the USY zeolite to 30 caused a significant reduction in the conversion, from 85% (for a USY zeolite catalyst with a silica to alumina ratio of 8) to 39%. The data of the table suggests that at least for USY zeolite, the silica to alumina ratio should be maintained well below 30, probably close to 10.

What is claimed is:

1. A method for the reduction of nitrogen oxides with ammonia which comprises:

contacting a gaseous stream containing nitrogen oxides and ammonia at a temperature of from about 250° C. to 600° C. with a catalyst composition comprising: (a) a zeolite having a silica to alumina ratio of at least about 10, and a pore structure which is interconnected in all three crystallographic dimensions by pores having an average kinetic pore diameter of at least about 7 Angstroms; and (b) a promoter selected from the group consisting of iron and copper in the amount of from about 0.1 to 30 percent by weight, calculated as the metal and based on the total weight of the metal and the zeolite.

2. The method of claim 1 wherein the promoter is present in the amount of from about 1 to 5 percent by weight of the total weight of the catalytic material.

3. The method of claim 2 wherein the promoter comprises iron.

4. The method of any one of claims 1, 2 or 3 wherein the zeolite is selected from the group consisting of USY, Beta and ZSM-20.

5. The method of any one of claims 1, 2 or 3 wherein the catalyst composition further includes a refractory binder admixed with the zeolite.

6. The method of claim 2 wherein the zeolite is USY, and the upper limit of the silica to alumina ratio is less than 30.

7. The method of any one of claims 1, 2 or 3 wherein the catalyst composition consists essentially of said zeolite, said promoter and a suitable binder.

* * * * *